United States Patent [19]
Principe

[11] Patent Number: 5,125,993
[45] Date of Patent: Jun. 30, 1992

[54] METHOD FOR FORMING AND CONSOLIDATING A FIBER REINFORCED RESIN STRUCTURE

[75] Inventor: Frank S. Principe, Hockessin, Del.

[73] Assignee: E. I. Du Pont de Nemours and Company, Wilmington, Del.

[21] Appl. No.: 735,841

[22] Filed: Jul. 25, 1991

[51] Int. Cl.⁵ .................. B29C 43/20; B29C 43/56
[52] U.S. Cl. .................. 156/155; 156/173; 156/245; 264/258; 264/313; 264/317; 264/101
[58] Field of Search ........... 264/257, 258, 313, 221, 264/314, 317, 101, 102, 510, 511, 512, 573; 156/155, 173, 245

[56] References Cited

U.S. PATENT DOCUMENTS

| | | | |
|---|---|---|---|
| 3,165,569 | 1/1965 | Bright | 264/313 |
| 4,155,970 | 5/1979 | Cassell | 264/257 |
| 4,167,430 | 9/1979 | Arachi | 264/258 |
| 4,187,271 | 2/1980 | Rolston | 264/258 |
| 4,474,636 | 10/1984 | Bogner | 264/258 |

OTHER PUBLICATIONS

Electrovert, "Metallic Core Technology TM and The LMD 2000 TM", 1988.
Metals Handbook Ninth Edition, vol. 2 Properties and Selection: Non Ferrous Alloys and Pure Metals, 1988.

*Primary Examiner*—Jay H. Woo
*Assistant Examiner*—Jeremiah F. Durkin, II

[57] ABSTRACT

Fiber reinforced resin composite structures are cured and fully consolidated while compensating for incomplete initial compaction of prepreg between cores, and the mandrel's thermal growth which spreads the cores apart by forming the structure around a metal alloy form fastened to a mandrel wherein the coefficient of thermal expansion of the metal alloy is greater than that of the mandrel.

6 Claims, 3 Drawing Sheets

METHOD FOR FORMING AND CONSOLIDATING A FIBER REINFORCED RESIN STRUCTURE

BACKGROUND OF THE INVENTION

This invention relates to a method for forming and consolidating fiber reinforced composite structures with hollow sections or passages through the structure.

Formation of high quality, complex, and dimensionally accurate hollow sections in resin based composite parts reinforced with such fibers as glass, quartz and carbon fibers has been limited by core material performance. In some cases plaster cores are too brittle for normal handling procedures. This can be a particular problem when thin core cross-sections are involved. Rubber has temperature limitations and cannot provide a dimensionally accurate hollow section. Metal cores such as steel or aluminum cannot be removed from complex shaped hollow sections under conditions mild enough to prevent excessive degradation of the resin based composite. Bi/Sn or Sn/Pb (commonly referred to as low melt alloys are known for creating relatively low melting point cores that in turn can be used to injection mold hollow plastic components. Additionally, these low melt alloys can be melted out to form very complex and dimensionally accurate passageways or hollow shapes without harming the physical properties of the plastic material. However, these low melting alloys are not useful as cores for polymer prepregs that cure at high temperatures in the range of from a minimum of about 600° to a maximum of about 700° F. and finally post-cure at temperatures from 700° F. to about 750° F.

In addition, fiber reinforced resin structures are formed into many complex shapes, in some cases these shapes include passageways which make consolidation of these structures during their cure cycle difficult. The structures are usually formed by wrapping a prepreg around one or more cores which are then attached to a steel mandrel and placed in an autoclave for curing under predetermined temperatures and pressures. What makes consolidation during the cure cycle so difficult is the formation of gaps between wrapped cores due to looseness required for assembly and the fact that the steel mandrel expands as the temperature increases which increases the gaps between the wrapped cores. In addition, volatiles are lost from the prepreg material as the temperature increases, thus decreasing the thickness of the prepreg material. All three of these factors contribute to a poorly consolidated product.

SUMMARY OF THE INVENTION

In order to fully consolidate the prepreg of a composite structure having passages within the structure during the cure cycle the amount of core expansion must be somewhat greater than the mandrel expansion to compensate for the gap increases caused by expansion of the mandrel and loss of volatiles from the prepreg material and to compensate for any looseness between the wrapped cores after assembly. The amount of thermal expansion required by the core material to ensure consolidation of the prepreg is dependent on these factors and the maximum cure temperature of the composite structure. One way this is accomplished is to provide a plurality of metal alloy forms defining the configuration of the passages then cover the metal alloy forms with a heat curable composite prepreg material having a predetermined cure temperature. The metal alloy forms covered with prepreg material are placed on a mandrel in a side-by-side relationship. The mandrel and the metal alloy having different coefficients of thermal expansion, the coefficient of thermal expansion (CTE) of the metal alloy core being greater than the coefficient of thermal expansion of the mandrel. In a preferred embodiment the core is a zinc/aluminum alloy having CTE about three (3) times the CTE of the mandrel. The metal alloy core has a melting temperature above the minimum cure temperature of the prepreg material. Free movement between the metal alloy cores covered with composite prepreg material and the mandrel is restricted. The unitary structure is heated to the predetermined cure temperature to fully cure and consolidate the composite prepreg material. If the metal alloy cores are not geometrically locked into the structure after autoclave curing, they may be removed by pulling-/pushing them out. In the event that the metal alloy cores are locked into the structure by curves in the passages and by varying cross sections, the cores can be melted out leaving the finished hollow structure.

Suitable prepreg materials are polyimide resins based on 2,2-bis(3',4'-dicarboxyphenyl) hexafluoropropane/p-phenylenediamine/m-phenylenediamine mixtures (e.g. AVIMID N), pyromellitic diethyl ester diacid/1,4-bis(4-aminophenoxy)-2-phenylbenzene mixtures (e.g. AVIMID K), 3,3',4,4'-benzophenonetetracarboxylic dimethyl ester diacid/4,4'-methylenedianiline/nadic methyl ester acid mixtures (e.g. PMR-15), and the dimethyl ester diacid derivatives of 2,2-bis(3',4'-dicarboxyphenyl)hexafluoropropane dianhydride mixed with p-phenylenediamine and nadic methyl ester acid (e.g. AF-R-700A and B, PMR-II-30 and PMR-II-50), reinforced with fibers such as carbon, glass, quartz and aramid fibers.

DETAILED DESCRIPTION OF THE ILLUSTRATED EMBODIMENT

Figure 1:
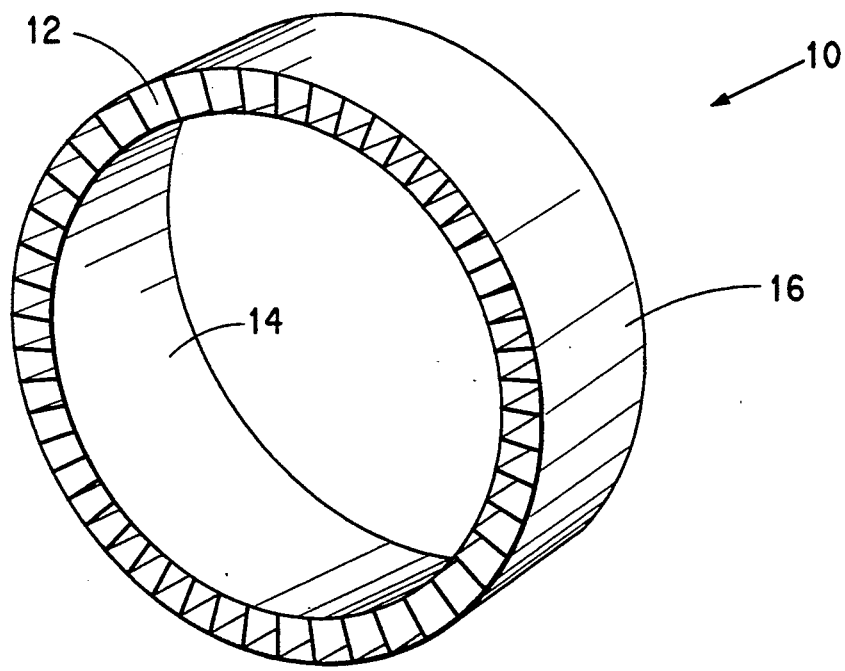
FIG. 1 is a perspective view of a composite structure formed according to the method of this invention.
Figure 2:
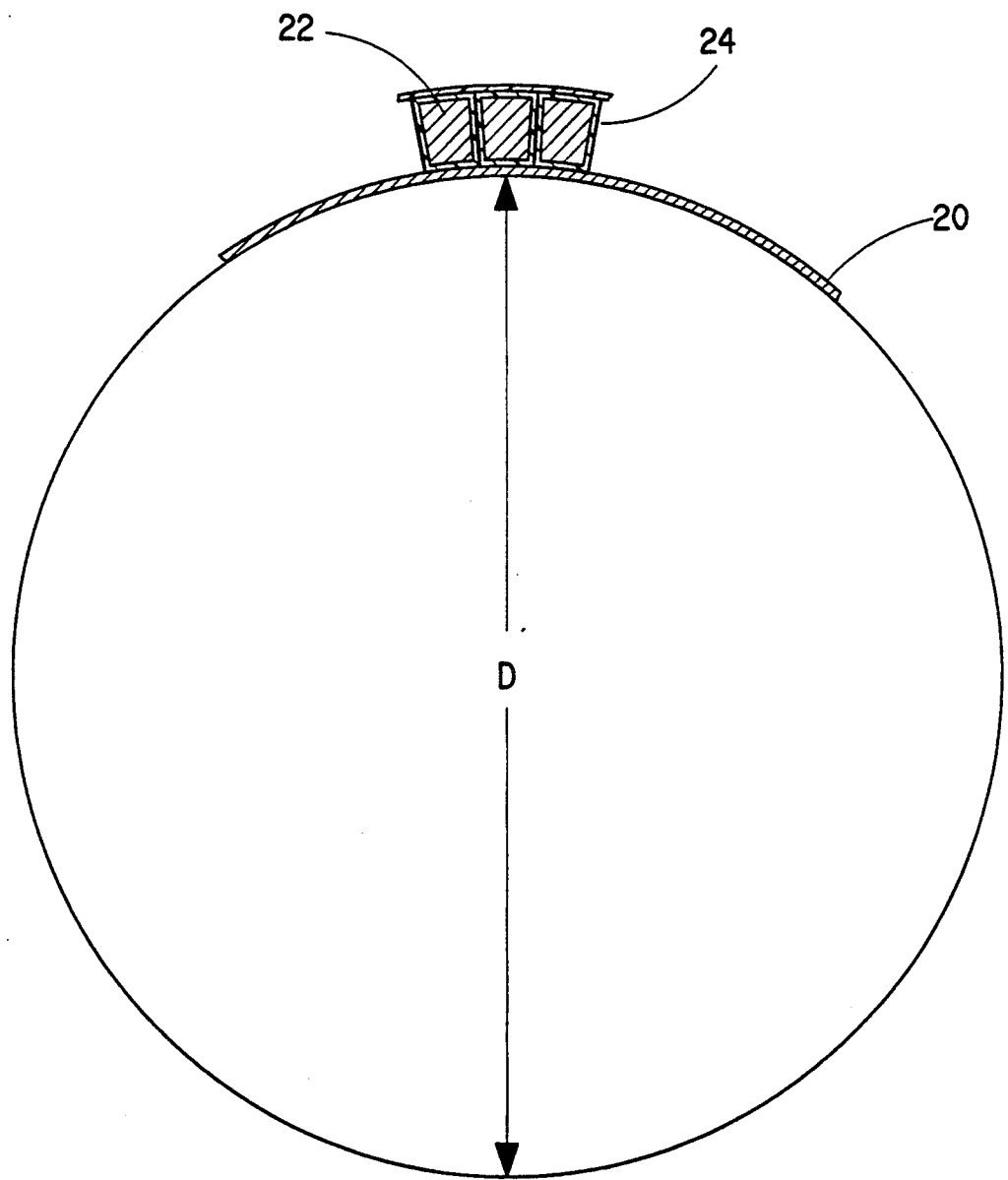
FIG. 2 is a cross sectioned end elevation of the assembly for preparation of the structure of FIG. 1.
Figure 3:
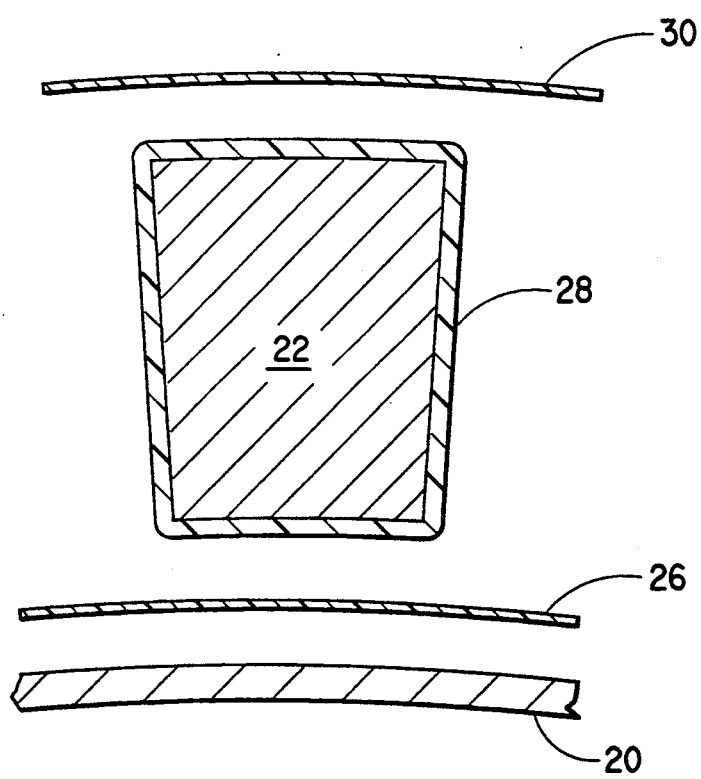
FIG. 3 is an enlarged expanded view of one segment of the assembly shown in FIG. 2.

Referring now to the drawings, the embodiment chosen for purposes of illustration as shown in FIG. 1 is a composite full round duct 10 with a plurality of passages 12 distributed between inner and outer surfaces 14, 16, respectively, of the duct. The preparation of this duct involves an assembly of parts on a mandrel to form the structure followed by curing and post-curing the formed structure. More particularly, as shown in FIG. 2, the layup of the structure includes a mandrel 20 fabricated from a length of carbon steel pipe of a predetermined diameter D on which are fixed metal alloy cores 22. Each core 22 is wrapped with a prepreg material 24. The wrapped forms are configured to conform to the curvature of the mandrel. A more detailed description of the layup is shown in FIG. 3 wherein a layer 26 of a fiber reinforced resin prepreg is wrapped around mandrel 20 to form the inner surface 14 of the duct 10. The metal alloy core 22 is wrapped with a fiber reinforced resin prepreg material 28. After the wrapped cores are fixed to the mandrel an outside face sheet 30 is wrapped around all the forms on the mandrel to form the outside surface 16 of the duct 10.

In a particularly preferred embodiment, the metal alloy core is preferably zinc/aluminum alloy #3 or #5 made by Eastern Alloys, Inc. having a CTE of about $20 \times 10^{-6}$ in./in./°F.

The mandrel is of carbon steel with a CTE of about $7 \times 10^{-6}$ in./in./°F.

The layers 26 and 30 and the wrapping materials 28 preferably are AVIMID N prepreg by Du Pont reinforced with S2 glass fiber by Owens Corning.

Upon completion of the structural layup, the assembly is enclosed in a bag with vacuum lines attached and placed in autoclave for curing. The autoclave cure cycle lasts for about 20 hours and the maximum temperature is below the melt temperature of the metal alloy cores.

The mandrel layup assembly is debagged following the autoclave cure cycle and placed in an oven for post cure. The post cure cycle slowly raises the $T_g$ of the AVIMID N based composites to the desired level. Finally the part is heated above the metal alloy's melt temperature with the result that the cores will melt out in the oven. Alternatively, if the final post cure temperature is below the core's melt temperature, the cores can be removed using induction heating techniques.

What is claimed is:

1. A method for forming and consolidating a composite structure having hollow sections or passages therein comprising: providing a plurality of metal alloy cores defining the configuration of said hollow sections or passages; covering said metal alloy cores with a heat curable composite prepreg material having a predetermined cure temperature; placing said metal alloy cores covered with prepreg material on a mandrel in a side-by-side relationship, said mandrel and said metal alloy cores having different coefficients of thermal expansion, the coefficient of thermal expansion of said metal alloy core being greater than the coefficient of thermal expansion of said mandrel, restricting free relative movement between the metal alloy cores covered with composite prepreg material and the mandrel to form a unitary structure; heating said unitary structure to said predetermined cure temperature to consolidate and cure said composite prepreg material.

2. The method of claim 1 including the additional steps of heating said metal alloy core to a temperature to melt said alloy and draining the melted metal alloy from the unitary structure.

3. The method of claim 1 wherein said metal alloy cores are a zinc/aluminum alloy.

4. The method of claim 1 wherein said coefficient of thermal expansion of said cores is about three times greater than the coefficient of expansion of said mandrel.

5. The method of claim 1 wherein said composite prepreg material is 2,2-bis (3',4'-dicarboxyphenyl) hexafluoropropane/p-phenylenediamine/m-phenylenediamine mixtures.

6. A method for forming a hollow composite structure from a prepreg material having a cure and a post-cure temperature comprising: providing a metal alloy core that defines the configuration of the hollow portion of said structure, said alloy having a melt temperature above said cure temperature; covering said alloy core with a heat curable prepreg material to form said structure, said prepreg material having a predetermined cure temperature in the range of from about 600° F. to about 700° F. and a post-cure temperature of from about 700° F. to about 750° F.; and heating said structure under vacuum to a predetermined cure temperature followed by heating said structure to said post-cure temperature.

* * * * *